(12) United States Patent
Komoto et al.

(10) Patent No.: US 7,208,552 B2
(45) Date of Patent: Apr. 24, 2007

(54) BINDER RESIN COMPOSITIONS, PRODUCTION PROCESS AND USE THEREOF

(75) Inventors: Naosuke Komoto, Yamaguchi (JP); Hidetoshi Yoshioka, Yamaguchi (JP)

(73) Assignee: Nippon Paper Industries, Co., Ltd., Tokyo (JP)

( * ) Notice: Subject to any disclaimer, the term of this patent is extended or adjusted under 35 U.S.C. 154(b) by 0 days.

(21) Appl. No.: 10/500,111

(22) PCT Filed: Dec. 20, 2002

(86) PCT No.: PCT/JP02/13345

§ 371 (c)(1),
(2), (4) Date: May 27, 2005

(87) PCT Pub. No.: WO03/057778

PCT Pub. Date: Jul. 17, 2003

(65) Prior Publication Data

US 2006/0025533 A1    Feb. 2, 2006

(30) Foreign Application Priority Data

Dec. 28, 2001 (JP) ............................ 2001-400090
Feb. 28, 2002 (JP) ............................ 2002-053418

(51) Int. Cl.
*C08F 8/20* (2006.01)

(52) U.S. Cl. ................ 525/326.4; 525/285; 525/355; 525/334.1; 525/386

(58) Field of Classification Search ............... 525/285, 525/326.4, 355, 334.1, 386
See application file for complete search history.

(56) References Cited

U.S. PATENT DOCUMENTS 6,586,525 B1 * 7/2003 Urata et al. ................... 525/63

FOREIGN PATENT DOCUMENTS

| EP | 148 346 | 7/1985 |
|----|---------|--------|
| EP | 1 065 245 A1 * | 1/2001 |
| JP | 57-36128 | 2/1982 |
| JP | 63-36624 | 7/1988 |
| JP | 5-222320 | 8/1993 |
| JP | 7-18016 | 1/1995 |
| JP | 10-168123 | 6/1998 |
| JP | 11-302324 | 11/1999 |
| JP | 11-315185 | 11/1999 |
| JP | 3045498 | 3/2000 |
| JP | 2001-114961 | 4/2001 |
| WO | WO 00/26310 | 5/2000 |

* cited by examiner

*Primary Examiner*—Ling-Sui Choi
(74) *Attorney, Agent, or Firm*—Oblon, Spivak, McClelland, Maier & Neustadt, P.C.

(57) ABSTRACT

The invention provides a novel binder resin composition with good adherence onto prime materials of polyolefin, poly (vinyl chloride), polycarbonate, PET, ABS and nylon, and also with excellent solvent solubility.

A binder resin composition characterized by being chlorinated propylenic random copolymer with weight average molecular weight of 3000 to 250000, wherein propylenic random copolymer with melting point (Tm) measured by differential scanning calorimeter (DSC) of 115 to 165° C. obtained by copolymerizing propylene with other α-olefin in the coexistence of metallocene type catalyst is chlorinated to chlorine content of 10 to 40% by weight, after thermal degradation or directly without thermal degradation, and/or a binder resin composition characterized by containing carboxyl group-containing chlorinated propylenic random copolymer with weight average molecular weight of 30000 to 220000, wherein propylenic random copolymer with melting point (Tm) measured by differential scanning calorimeter (DSC) of 115 to 165° C. obtained by copolymerizing propylene with other α-olefin in the coexistence of metallocene type catalyst is grafted with α,β-unsaturated carboxylic acid or its anhydride in amounts of 0.1 to 20% by weight, after thermal degradation or directly without thermal degradation, and then chlorinated to chlorine content of 10 to 40% by weight, stabilizer and organic solvent.

10 Claims, No Drawings

BINDER RESIN COMPOSITIONS, PRODUCTION PROCESS AND USE THEREOF

TECHNICAL FIELD

The present invention relates to a binder resin composition to be used for the purpose of protection or beautiful ornament of polyolefinic resins such as polypropylene, polyethylene, ethylene-propylene copolymer and ethylene-propylene-diene copolymer, vinyl chloride resin, polycarbonate (PC) resin, poly(ethylene terephthalate) (PET) resin, acrylonitrile-butadiene-styrene (ABS) resin and nylon resin, and method for the production thereof. In more detail, it relates to a binder resin composition for paint, printing ink, adhesive or primer that exhibits excellent adherence and other physical properties to sheets, films and moldings of these polyolefin, poly(vinyl chloride), polycarbonate, PET, ABS and nylon.

BACKGROUND TECHNOLOGIES

Because of many advantages of light weight, antirust, broad degree of freedom for design, etc., in recent years, plastics are used extensively as materials for automotive parts, electrical parts, building materials, etc. Above all, because of low price and many excellent properties such as moldability, chemical resistance, heat resistance, water resistance, good electrical characteristics, polyolefinic resins are used in a wide range as industrial materials and the growth of demand is also expected in future. Different from synthetic resins with polarity, however, polyolefinic resin is nonpolar and crystalline, hence it has also a drawback of difficult adhesion with it.

For this reason, as a pretreatment for painting and adhesion, method of providing plasma treatment or gas flame treatment onto the surface of moldings to activate, or method of painting primer (undercoating agent) having chlorinated polyolefin as a major component is adopted.

For the painting of polypropylene bumper of automobiles, for example, primer compositions having chlorinated modified polyolefin as a major component are disclosed in Japanese Unexamined Patent Publication No. Sho 57-36128 and Japanese Patent Publication No. Sho 63-36624.

With these primers comprising chlorinated products, the adherence onto polyolefin having been produced hitherto is excellent, but, it is the present situation that, with the advent of high-modularization of prime material and low-temperature baking in recent years, prime materials that give insufficient adherence are seen, making it impossible to correspond sufficiently with conventional chlorinated polyolefinic resins.

Furthermore, it is the present situation that the chlorinated polyolefinic resins exhibit relatively excellent adherence onto polypropylene prime material, but the adherence is insufficient onto other prime materials (poly(vinyl chloride), polycarbonate, PET, ABS and nylon).

The chlorinated polyolefin resins etc. having been proposed hitherto were those having chlorinated isotactic polypropylene (hereinafter IPP), wherein IPP produced by using Ziegler-Natta catalyst as a polymerization catalyst was chlorinated, as a major component.

Whereas, an adhesive that uses chlorinated syndiotactic polypropylene (hereinafter SPP), wherein SPP produced by using metallocene compound as a polymerization catalyst was chlorinated is disclosed (Japanese Patent No. 3045498 and Japanese Unexamined Patent Publication No. Hei 7-18016). However, this chlorinated SPP has more improved solvent solubility than that of conventional chlorinated IPP produced by using Ziegler-Natta catalyst as a polymerization catalyst, but it exhibited excellent adherence only when the prime material is polypropylene and it has a drawback of insufficient adherence onto other prime materials (poly(vinyl chloride), polycarbonate, PET, ABS and nylon).

The purpose of the invention is to provide a binder resin composition with good adherence and gasohol resistance to various polyolefins including polypropylene prime material, poly(vinyl chloride), polycarbonate, PET, ABS and nylon prime materials and also with excellent solvent solubility.

DISCLOSURE OF THE INVENTION

The inventors have come to solve the problems aforementioned with a binder resin composition characterized by being chlorinated propylenic random copolymer with weight average molecular weight of 3000 to 250000, wherein propylenic random copolymer with melting point (Tm) measured by differential scanning calorimeter (DSC) of 115 to 165° C. obtained by copolymerizing propylene with other α-olefin in the coexistence of metallocene type catalyst was chlorinated to chlorine content of 10 to 40% by weight, after thermal degradation or directly without thermal degradation, and/or a binder resin composition characterized by being carboxyl group-containing chlorinated propylenic random copolymer with weight average molecular weight of 30000 to 220000, wherein propylenic random copolymer with melting point (Tm) measured by differential scanning calorimeter (DSC) of 115 to 165° C. obtained by copolymerizing propylene with other α-olefin in the coexistence of metallocene type catalyst was grafted with α,β-unsaturated carboxylic acid or its anhydride, after thermal degradation or directly without thermal degradation, and then chlorinated to chlorine content of 10 to 40% by weight.

The propylenic random copolymer being raw material of the invention is a copolymer obtained by copolymerizing propylene being major component with other α-olefin using metallocene catalyst as a polymerization catalyst. Commercial products such as Wintech (from Nippon Polychem Co., Ltd.) can also be used.

For the other α-olefin being comonomer, at least one kind can be selected from ethylene or a group consisting of olefins with number of carbon atoms of 4 or more. As the olefins with number of carbon atoms of 4 or more, 1-butene, 1-hexene, 4-methyl-1-pentene, 1-octene, etc. can be mentioned. By using metallocene catalyst, the range of copolymerizable comonomers can be widened over Ziegler-Natta catalyst.

For the metallocene catalyst to be used in the invention, publicly known one can be used. Concretely, such catalyst obtainable by combining components (A) and (B), and, if need be, additionally (C) described below is preferable.

Component (A): Metallocene complex being a compound of transition metal that belongs to groups 4 to 6 in the periodic table having at least one of conjugate 5-membered ring ligand.

Component (B): Cocatalyst capable of activating said metallocene complex (A) by reacting compound (B) with metallocene complex (A) (ion-exchangeable stratified silicate).

Component (C): Organic aluminum compound.

The propylenic random copolymer of the invention can be produced by publicly known methods (Japanese Unexamined Patent Publication No. 2001-206914 etc.). For example, while supplying propylene, ethylene and hydrogen into the reactor and while continuously adding alkyl aluminum and metallocene catalyst, the production is performed.

The propylenic random copolymer of the invention is preferable to have melting point (hereinafter Tm) measured by differential scanning calorimeter (hereinafter DSC) of 115 to 165° C. If higher than 165° C., then the solvent solubility decreases. If lower than 115° C., then the adherence onto prime materials decreases. More preferable is low-melting point propylenic random copolymer with 115 to 135° C. Besides, in the measuring method of Tm by DSC in the invention, the evaluation was made with both peak temperature of melting and end temperature of melting at the time when sample (ca. 5 mg) was taken and molten for 5 minutes at 200° C., and, after lowering the temperature to 40° C. at a rate of 10° C./min to crystallize, the temperature was raised further to 200° C. at a rate of 10° C./min to melt, using DSC measurement apparatus from Seiko Co.

For the propylenic random copolymer of the invention, it doesn't matter whether one thermally degraded at a temperature above melting point and below 350° C. in the presence of radical generator or one without thermal degradation is used solely or by mixing, employing Banbury mixer, kneader, extruder or the like. The radical generator to be used for the reaction can be selected appropriately from publicly known ones, but, in particular, organic peroxide type compound is desirable.

As said organic peroxide type compounds, for example, di-t-butyl peroxide, dicumyl peroxide, t-butylcumyl peroxide, benzoyl peroxide, dilauryl peroxide, cumene hydroperoxide, t-butyl hydroperoxide, 1,1-bis(t-butylperoxy)-3,5,5-trimethylcyclohexane, 1,1-bis(t-butylperoxy)cyclohexane, cyclohexanone peroxide, t-butylperoxy benzoate, t-butylperoxy isobutyrate, t-butylperoxy-3,5,5-trimethyl hexanoate, t-butylperoxy-2-ethyl hexanoate, t-butylperoxyisopropyl carbonate, cumylperoxy octoate, etc. are mentioned.

The chlorinated propylenic random copolymer of the invention can be obtained by introducing chlorine to said propylenic random copolymer. The chlorination reaction is conducted by dissolving said propylenic random copolymer into chlorine-based solvent such as chloroform, and then by blowing-in gaseous chlorine while irradiating ultraviolet rays or in the presence of said organic peroxide.

The chlorine content is optimum to be 10 to 40% by weight, preferably 15 to 30% by weight. If lower than this range, then the adherence onto various prime materials becomes better, but the solubility into organic solvent decreases. Also, If higher than this range, then the adherence onto various prime materials decreases. Besides, the chlorine content is a value measured according to JIS-K7229.

The weight average molecular weight (hereinafter Mw) of the chlorinated propylenic random copolymer to be used in the invention is 3000 to 250000. If under 3000, the cohesion of resin is insufficient, and, if over 250000, then the handlings of ink and adhesive are lowered, which is unpreferable. Besides, the Mw in the invention is a value measured by means of gel permeation chromatography (hereinafter GPC, standard substance: polystyrene resin).

Moreover, the carboxyl group-containing chlorinated propylenic random copolymer of the invention can be obtained by introducing α,β-unsaturated carboxylic acid and chlorine to said propylenic random copolymer and the production thereof is possible by two methods mentioned below; namely, a method (first method) wherein, after directly graft polymerizing α,β-unsaturated carboxylic acid or its anhydride onto thermally degraded propylenic random copolymer or propylenic random copolymer without thermal degradation, the chlorination reaction is conducted, and a method (second method) wherein, after the chlorination reaction, α,β-unsaturated carboxylic acid or its anhydride is graft polymerized.

In following, concrete methods for the production will be exemplified. In the first method, first the method of directly graft copolymerizating α,β-unsaturated carboxylic acid or its anhydride onto thermally degraded propylenic random copolymer or propylenic random copolymer without thermal degradation can be performed by publicly known methods of a method (melt method) wherein said rein is molten by heating above melting point in the presence of radical generator to react, a method (solution method) wherein said rein is dissolved into organic solvent and then the solution is stirred under heating in the presence of radical generator to react, and the like.

In the case of the melt method, the reaction is conducted for a short time at a temperature above melting point and below 350° C. employing Banbury mixer, kneader, extruder or the like, hence it has an advantage of simple manipulation.

On the other hand, in the case of the solution method, aromatic solvent such as toluene or xylene is used desirably as an organic solvent, but, besides, it may also be safe to use ester solvent, ketonic solvent or the like by mixing partially. The radical generator to be used for the reaction can be selected appropriately from publicly known ones, but, in particular, organic peroxide type compound is desirable and compounds listed above can be used.

However, in the case of the second method, when conducting the chlorination reaction after α,β-unsaturated carboxylic acid or its anhydride was graft copolymerized, it is required to replace said solvent with chlorinating solvent such as chloroform, hence, in the first method, melt method is more preferable.

Said chlorination reaction to be conducted after carboxyl group modification is performed by dissolving propylenic random copolymer or propylenic random copolymer graft copolymerized with α,β-unsaturated carboxylic acid or its anhydride into chlorine-based solvent such as chloroform and then by blowing-in gaseous chlorine while irradiating ultraviolet rays or in the presence of said organic peroxide.

In the method wherein, after the chlorination reaction, α,β-unsaturated carboxylic acid or its anhydride is graft polymerized being the second method, first, propylenic random copolymer is dissolved into chlorine-based solvent such as chloroform and the chlorination reaction is conducted similarly to the first method to produce chlorinated propylenic random copolymer, then solvent is changed to a solvent such as toluene or xylene, and α,β-unsaturated carboxylic acid or its anhydride is graft copolymerized in the presence of said organic peroxide. The reaction can be carried out at a temperature above 50° C. and below the boiling point of solvent. However, in the second method, the graft polymerizability of α,β-unsaturated carboxylic acid or its anhydride is low at the reaction temperature above 50° C. and below 100° C., and the chlorinated propylenic random copolymer has a potential to cause the de-hydrochloric acid above 100° C. and below the boiling point of solvent. Hence the first method is more preferable than the second method.

The purpose of graft copolymerizing α,β-unsaturated carboxylic acid or its anhydride onto propylenic random copolymer in the first method is to afford the adherence to upper coating paint when using the binder resin composition of the invention as a primer. The chlorinated polyolefin has originally low polarity, hence, when using as a primer (undercoating agent) as it is, the adherence onto PP prime material is good, but little adherence is seen onto high-polar upper coating paints (e.g. polyurethane paint and melamine paint). Hence it becomes important to enhance the polarity of chlorinated polyolefin by graft copolymerizing α,β-unsaturated carboxylic acid or its anhydride. As usable α,β-unsaturated carboxylic acids or their anhydrides, for example, maleic acid, citraconic acid, itaconic acid, aconitic acid and their anhydrides, acrylic acid, methacrylic acid, fumaric acid, mesaconic acid, etc. are exemplified, but, when considering the grafting ability onto polyolefin resin, maleic anhydride is most suitable.

In the invention, the amount to be introduced by graft copolymerizing α,β-unsaturated carboxylic acid or its anhydride is optimum to be 0 to 20% by weight and preferable is 0 to 10% by weight. If over 10% by weight, the moisture resistance tends to decrease when using as a primer.

The chlorine content is optimum to be 10 to 40% by weight, preferably 15 to 30% by weight. If lower than this range, then the adherence onto various prime materials becomes better, but the solubility into organic solvent decreases. Also, If higher than this range, then the adherence onto various prime materials decreases. Besides, the chlorine content is a value measured according to JIS-K7229.

The weight average molecular weight (hereinafter Mw) of the chlorinated propylenic random copolymer and the carboxyl group-containing chlorinated propylenic random copolymer to be used in the invention is 3000 to 250000 in the former. If under 3000, the cohesion of resin is insufficient, and, if over 250000, then the spraying property decreases, which is unpreferable. Also in the case of the latter, it is 30000 to 220000. If under 30000, the cohesion of resin is insufficient, and, if over 220000, then the spraying property decreases, which is unpreferable. Besides, the Mw in the invention is a value measured by means of gel permeation chromatography (hereinafter GPC, standard substance: polystyrene resin).

The chlorinated polyolefin accompanies the de-hydrochloric acid to degrade when exposing to ultraviolet rays or high temperature. When the chlorinated polyolefin causes the degradation by de-hydrochloric acid, decreased physical properties such as decreased adherence onto polypropylene prime material as well as coloring of resin, and aggravation of working environment due to freed hydrochloric acid are caused. From these facts, it is required to add a stabilizer. For obtaining this effect, it is preferable to add 0.1 to 5% by weight of stabilizer based on the resin component (solids). As the stabilizer, epoxy compound can be exemplified. The epoxy compound is not particularly restricted, but one compatible with chlorinated resin is preferable and such epoxy compound with epoxy equivalent of around 100 to 500 and with one or more epoxy groups in a molecule can be exemplified. For example, epoxidated soybean oil and epoxidated linseed oil epoxidated natural vegetable oils with unsaturated group with peracid such as peracetic acid, epoxidated fatty acid esters epoxidated unsaturated fatty acids such as oleic acid, tall oil fatty acid and soybean oil fatty acid, epoxidated alicyclic compounds represented by epoxidated tetrahydrophthalate, condensation products of bisphenol A and polyhydric alcohols with epichlorohydrin, for example, bisphenol A glycidyl ether, ethylene glycol glycidyl ether, propylene glycol glycidyl ether, glycerol polyglycidyl ether, sorbitol polyglycidyl ether, etc. can be exemplified. Moreover, monoepoxy compounds represented by butyl glycidyl ether, 2-ethylhexyl glycidyl ether, decyl glycidyl ether, stearyl glycidyl ether, allyl glycidyl ether, phenyl glycidyl ether, sec-butylphenyl glycidyl ether, tert-butylphenyl glycidyl ether, phenol polyethylene oxide glycidyl ether, etc. are exemplified. Moreover, metallic soaps such as calcium stearate and lead stearate used as stabilizers for poly(vinyl chloride) resin, organometallic compounds such as dibutyl tin dilaurate and dibutyl maleate and hydrotalcite compounds can also be used, and it may be safe to use these in combination.

The composition of the invention can also be used after dissolved into organic solvent. The solution concentration may be selected appropriately depending on the uses, but, the coating workability is injured at either too high or too low solution concentration, hence the resin concentration is preferable to be 5 to 60% by weight. For the solvent to be used, aromatic solvents such as toluene and xylene are preferable, and, besides, ester solvents such as ethyl acetate and butyl acetate, ketonic solvents such as methyl ethyl ketone and methyl isobutyl ketone, aliphatic solvents such as n-hexane and heptane, alicyclic solvents such as cyclohexane, methylcyclohexane and ethylcyclohexane can be used. In addition, for enhancing the preservative stability of resin solution, it is preferable to add alcohols such as methanol, ethanol and isopropyl alcohol, propylenic glycol ethers such as propylene glycol methyl ether, propylene glycol ethyl ether and propylene glycol tertiary-butyl ether solely or by mixing two or more kinds in amounts of 1 to 20% by weight based on said solvent. The recipe when dissolving the binder resin composition of the invention into organic solvent is possible by converting the chlorinating solvent such as chloroform being reaction solvent to said solvent using the difference of boiling point. Also, it may be safe that, after epoxy compound etc. were added to the reaction liquor having finished the reaction as stabilizers, it is fed to a vent extruder equipped with solvent-removing suction portion at screw shaft section to solidify and then dissolved into said solvent. The solidification can be carried out by the methods already known publicly, for example, by using vent extruder equipped with underwater cutting pelletizer at blow-off opening portion of extruder, vent extruder and pelletizer that cuts strand-like resin, etc.

The binder resin composition according to the invention can be used as a paint, printing ink, adhesive and primer applicable to films, sheets and moldings of polyolefin, poly(vinyl chloride), polycarbonate, PET, ABS and nylon. It may be used by coating as it is, but solvent, pigment and other additives may be added within a range not injuring the effect of the invention. Moreover, although said composition exhibits balanced physical properties of coated film by itself, it may be safe to use by further adding cyclized rubber, petroleum resin, cumarone-indene resin, chlorinated polyolefin resin, acrylic resin, alkyd resin, etc., if need be. In particular, it is preferable to contain the binder resin composition of the invention in amounts of 30% or more by weight.

EMBODIMENT TO PUT THE INVENTION INTO PRACTICE

One of the features of the propylenic random copolymer produced by using metallocene catalyst as a polymerization catalyst is that it has a lower melting point-glass transition point than that of the propylenic random copolymer produced by using conventional Ziegler•Natta catalyst as a polymerization catalyst. It is considered therefore that, even if making the chlorine content low, the solvent solubility is good, and additionally, due to lower melting point, the adherence at the time of low-temperature baking becomes good.

Moreover, it is mentioned that, as a feature of the propylenic random copolymer produced by using metallocene catalyst as a polymerization catalyst, the molecular weight distribution is very narrow (Mw/Mn=ca. 2 or less).

Furthermore, it has also newly become clear that, in the case of the propylenic random copolymer produced by using conventional Ziegler•Natta catalyst as a polymerization catalyst, decrease in the molecular weight, that is, formation of low-molecular weight components is caused inevitably, but, in the case of the propylenic random copolymer produced by using metallocene catalyst as a polymerization catalyst, formation thereof is little, because organic peroxide etc. are used when graft copolymerizing α,β-unsaturated carboxylic acid or its anhydride.

In the invention, although no distinct reason is seen, it has been found that, different from the propylenic random copolymer produced by using conventional Ziegler•Natta catalyst as a polymerization catalyst, the propylenic random copolymer produced by using metallocene catalyst as a polymerization catalyst exhibits excellent adherence onto wide range of prime materials such as poly(vinyl chloride), polycarbonate, PET, ABS and nylon, besides polyolefinic prime materials. Moreover, it is considered that, by using the propylenic random copolymer with less low-molecular weight components, produced by using metallocene catalyst as a polymerization catalyst, the gasohol resistance became good.

In following, the invention will be illustrated concretely based on examples, but the invention is not confined thereto.

EXAMPLE-1

A propylenic random copolymer (propylene ca. 97%-ethylene ca. 3%) (from Nippon Polychem Co., Ltd., MFR=2.0 g/10 min, Tm=125° C.) produced by using metallocene catalyst as a polymerization catalyst was fed into a double shaft extruder set at a barrel temperature of 350° C. to degrade thermally, thus obtaining a propylenic random copolymer with melt viscosity at 190° C. of about 1500 mPa·s. In a glass-lined reactor were put 500 g of this resin. After 5 L of chloroform were added, gaseous chlorine was blown-in from the bottom of reactor under a pressure of 2 kg/cm$^2$, while irradiating ultraviolet rays to chlorinate. On the way, 3-point samplings were made and chloroform being solvent was distilled off by evaporator. Thereafter, replacement was made with toluene/cyclohexane=70/30 (weight ratio) and Epicote 828 (from Yuka-Shell Epoxy Co., Ltd.) was added in amounts of 2% by weight based on resin as a stabilizer to obtain resin solutions of chlorinated propylenic random copolymer with resin concentration of 20% by weight. The physical properties of the resins are shown in Table 1. The resin solutions obtained were allowed to stand for one month at room temperature, but no changes were seen in the liquid state and appearance.

EXAMPLE-2

In a glass-lined reactor were put 500 g of propylenic random copolymer (propylene ca. 97%-ethylene ca. 3%) (Wintech, from Nippon Polychem Co., Ltd., MFR=2.0 g/10 min, Tm=125° C.) produced by using metallocene catalyst as a polymerization catalyst. After 5 L of chloroform were added, gaseous chlorine was blown-in from the bottom of reactor under a pressure of 2 kg/cm$^2$, while irradiating ultraviolet rays to chlorinate. On the way, 3-point samplings were made and chloroform being solvent was distilled off by evaporator. Thereafter, replacement was made with toluene/cyclohexane=70/30 (weight ratio) and Epiol TB (from Nippon Oil and Fats Co., Ltd.) was added in amounts of 2% by weight based on resin as a stabilizer to obtain resin solutions of chlorinated propylenic random copolymer with resin concentration of 20% by weight. The physical properties of the resins are shown in Table 1. The resin solutions obtained were allowed to stand for one month at room temperature, but no changes were seen in the liquid state and appearance.

EXAMPLE-3

A propylenic random copolymer (propylene ca. 97%-ethylene ca. 3%) (from Nippon Polychem Co., Ltd., MFR=2.0 g/10 min, Tm=125° C.) produced by using metallocene catalyst as a polymerization catalyst was fed into a double shaft extruder set at a barrel temperature of 350° C. to degrade thermally, thus obtaining a propylenic random copolymer with melt viscosity at 190° C. of about 2000 mPa·s. In a four-neck flask attached with stirrer, condenser, thermometer and dropping funnel, 500 g of this resin was molten by heating at 190° C. After nitrogen replacement in flask was performed for 10 minutes, 25 g of maleic anhydride were put-in over about 5 minutes while stirring, and 2 g of di-t-butyl peroxide were added dropwise over about 30 minutes as a radical generator. After the reaction was continued further for 30 minutes, unreacted maleic anhydride was removed while reducing the pressure in flask with aspirator. Next, this product was put in a glass-lined reactor, and, after 5 L of chloroform were added, gaseous chlorine was blown-in from the bottom of reactor under a pressure of 2 kg/cm$^2$, while irradiating ultraviolet rays to chlorinate. On the way, samplings were made and chloroform being solvent was distilled off by evaporator, respectively. Then, replacement was made with toluene/cyclohexane=70/30 (weight ratio) to obtain 20% by weight solutions of chlorinated propylenic random copolymer modified with maleic anhydride. Epicote 828 (from Yuka-Shell Epoxy Co., Ltd.) was added in amounts of 4% by weight based on resin as a stabilizer. The physical properties of the resins are shown in Table 1. The resin solutions obtained were allowed to stand for one month at room temperature, but no changes were seen in the liquid state and appearance.

EXAMPLE-4

In a double shaft extruder with L/D=34 and φ=40 mm were put 500 g of propylenic random copolymer (propylene ca. 97%-ethylene ca. 3%) (from Nippon Polychem Co., Ltd., MFR=7.0 g/10 min, Tm=125° C.) produced by using metallocene catalyst as a polymerization catalyst, 500 g of maleic anhydride and 15 g of dicumyl peroxide. The reaction was conducted making the retention time 10 minutes and barrel temperature 180° C. (first barrel through seventh barrel) and deaeration was made at the seventh barrel to remove unreacted maleic anhydride, thus obtaining maleic anhydride-modified propylenic random copolymer. In a glass-lined reactor were put 500 g of this resin, and, after 5 L of chloroform were added, gaseous chlorine was blown-in from the bottom of reactor under a pressure of 2 kg/cm$^2$, while irradiating ultraviolet rays to chlorinate. On the way, samplings were made and chloroform being solvent was distilled off by evaporator, respectively. Then, replacement was made with toluene/cyclohexane=70/30 (weight ratio) to obtain 20% by weight solutions of chlorinated propylenic random copolymer modified with maleic anhydride. Epiol SB (from Nippon Oil and Fats Co., Ltd.) was added respectively in amounts of 4% based on resin as a stabilizer. The physical properties of the resins are shown in Table 1. The resin solutions obtained were allowed to stand for one month at room temperature, but no changes were seen in the liquid state and appearance.

Comparative Example-1

An isotactic polypropylene (IPP) produced by using Ziegler•Natta catalyst as a polymerization catalyst was fed into a double shaft extruder set at a barrel temperature of 350° C. to degrade thermally, thus obtaining an IPP with melt viscosity at 190° C. of about 2000 mPa·s. Using 500 g of this resin, resin solutions of chlorinated IPP with resin concentration of 20% by weight were obtained, similarly to Example 1. The physical properties of the resins are shown in Table 1. The resin solutions obtained were allowed to stand for one month at room temperature, but no changes were seen in the liquid state and appearance.

Comparative Example-2

Using 500 g of syndiotactic polypropylene (SPP, MFR=3.7 g/10 min), resin solutions of chlorinated SPP with resin concentration of 20% by weight were obtained, similarly to Example 1. The physical properties of the resins are shown in Table 1. The resin solutions obtained were allowed to stand for one month at room temperature, but no changes were seen in the liquid state and appearance.

Comparative Example-3

An isotactic polypropylene (IPP) produced by using Ziegler•Natta catalyst as a polymerization catalyst was fed into a double shaft extruder set at a barrel temperature of 350° C. to degrade thermally, thus obtaining an IPP with melt viscosity at 190° C. of about 2000 mPa·s. Using 500 g of this resin, resin solutions of maleic anhydride-modified chlorinated IPP with resin concentration of 20% by weight were obtained, similarly to Example 2. The physical properties of the resins are shown in Table 1. The resin solutions obtained were allowed to stand for one month at room temperature, but no changes were seen in the liquid state and appearance.

Comparative Example-4

A syndiotactic polypropylene (SPP, MFR=3.7 g/10 min) was fed into a double shaft extruder set at a barrel temperature of 350° C. to degrade thermally, thus obtaining a SPP with melt viscosity at 190° C. of about 2000 mPa·s. From 500 g of this resin, resin solutions of maleic anhydride-modified chlorinated SPP with resin concentration of 20% by weight were obtained, similarly to Example 2. The physical properties of the resins are shown in Table 1. The resin solutions obtained were allowed to stand for one month at room temperature, but no changes were seen in the liquid state and appearance.

Comparative Example-5

In Example 1, without adding a stabilizer, resin solutions of chlorinated propylenic random copolymer with resin concentration of 20% by weight were obtained. When these resin solutions were allowed to stand for one month at room temperature, all of resin solutions discolored into reddish brown.

[Measuring Method of Physical Properties of Resin]
MFR (Melt Flow Rate)
Measurement was made according to Melt Flow Rate in JIS-K-6758 Testing Method of Polypropylene (conditions: 230° C., load 2.16 kgf).
Tm
The evaluation was made with both peak temperature of melting and end temperature of melting at the time when sample (ca. 5 mg) was taken and molten for 5 minutes at 200° C., and then, after lowering the temperature to 40° C. at a rate of 10° C./min to crystallize, the temperature was raised further to 200° C. at a rate of 10° C./min to melt, using DSC measurement apparatus from Seiko Co.
Chlorine Content
Measurement was made according to JIS-K-7229.
Weight Average Molecular Weight (Mw) and Number Average Molecular Weight (Mn)
Measurement was made by means of GPC (standard substance: polystyrene resin). Moreover, in the table, Mw/Mn shows the molecular weight distribution.
[Test of Liquid State]
The resin solution obtained was allowed to stand for one month at room temperature, and the liquid state and appearance were evaluated visually.
Criterion for Evaluation
○: No changes in the liquid state and appearance, even after one month.
Δ: Discoloration into reddish brown, after one month.
x: Gelation, after one month.
[Primer Test]
After 100 g of each of resin solutions (solids 20%) obtained from Examples 3 and 4 and Comparative examples 3 and 4 and 20 g of titanium dioxide were kneaded for 3 hours in a sand mill, viscosity was adjusted with xylene so as to give 13 to 15 seconds/20° C. through Ford cup No.4, and the mixture was painted onto an ultrahigh modulus PP plate (TX-933A, from Mitsubishi Chemical Industries Ltd.), poly(vinyl chloride) (PVC), polycarbonate (PC), PET, ABS or nylon-6 by air spray gun so as the film thickness to become about 10 μm. Next, cure type two-component urethane paint was painted (film thickness ca. 30 μm), which was dried for 30 minutes at 80° C. and, after allowed to stand for 24 hours at room temperature, the physical properties were evaluated. The results of primer test are shown in Table 2.

Adherence
On the coated surface, 100 cross-cuts that reach the base were made at intervals of 1 mm, and cellophane adhesive tape was adhered closely thereon. Then, it was peeled off in the direction of 180° to judge with the extent of remaining coated film.
Gasohol resistance: The painted plate was soaked into regular gasoline/ethanol=9/1 (v/v) for 120 minutes to observe the state of coated film.
Good: State of no abnormality in the coated film
No good: State of abnormality in the coated film
Water resistance: The painted plate was soaked into warm water of 40° C. for 240 hours to examine the state of coated film and adherence.
Good: Case of entirely no peeling
No good: Case of peeling caused
[Adhesiveness Test]

Heat Seal Test
Each of the resin solutions (solids 20 wt. %) obtained was coated onto an untreated PP, poly (vinyl chloride) (PVC) or PET with coating rod #14. After dried for 24 hours at room temperature, coated surfaces were superposed and heat sealed under the press conditions of 2 sec, 80° C. and 1 kg/cm². After 24 hours, 180° peeling strength (g/cm) was measured with Tensilon (pulling speed: 50 mm/min). The results of adhesiveness test are shown in Table 3.

[Ink Test]

After 100 g of each of resin solutions (solids 20 wt. %) obtained and 20 g of titanium dioxide were milled for 3 hours in a sand mill, the mixture was diluted with toluene so as the viscosity to become 25 to 30 seconds/20° C. through #3 Zahn cup to prepare ink. With the ink obtained, adhesive tape peeling test and heat seal test were performed. The results of ink test are shown in Table 4.

Adhesive Tape Peeling Test

By the similar method to heat seal test, ink was coated onto an untreated PP, poly(vinyl chloride) (PVC) or PET. After dried for 24 hours at room temperature, cellophane adhesive tape was stuck onto ink-coated surface, and the state of coated surface when peeling off at a stroke was examined.

Criterion for Evaluation

Good: State of entirely no peeling

No good: State of peeling caused

Heat Seal Test

Same as adhesiveness test.

TABLE 1

Physical properties of resin and test of liquid state

|  | Chlorine content (wt. %) | Maleic anhydride (wt. %) (based on chlorinated resin) | Average molecular weight Mw | Mn | Mw/Mn | Test of liquid state |
|---|---|---|---|---|---|---|
| Ex. 1-1 | 20.5 | — | 49800 | 26200 | 1.90 | ○ |
| -2 | 24.3 | | 49700 | 26000 | 1.91 | ○ |
| -3 | 32.0 | | 49800 | 26200 | 1.90 | ○ |

TABLE 1-continued

Physical properties of resin and test of liquid state

|  | Chlorine content (wt. %) | Maleic anhydride (wt. %) (based on chlorinated resin) | Average molecular weight Mw | Mn | Mw/Mn | Test of liquid state |
|---|---|---|---|---|---|---|
| Ex. 2-1 | 19.5 | — | 190000 | 104000 | 1.83 | ○ |
| -2 | 25.0 | | 191000 | 104000 | 1.83 | ○ |
| -3 | 31.0 | | 190000 | 103000 | 1.84 | ○ |
| Ex. 3-1 | 16.8 | 3.9 | 50800 | 27800 | 1.83 | ○ |
| -2 | 19.5 | 3.5 | 52400 | 27600 | 1.90 | ○ |
| -3 | 26.1 | 3.3 | 53000 | 27400 | 1.93 | ○ |
| Ex. 4-1 | 16.0 | 5.0 | 120000 | 62500 | 1.92 | ○ |
| -2 | 20.8 | 5.3 | 125000 | 64000 | 1.95 | ○ |
| -3 | 25.1 | 5.1 | 123000 | 62400 | 1.97 | ○ |
| Comp. 1-1 | 20.2 | — | — | — | — | X |
| -2 | 24.5 | | 200000 | 68000 | 2.95 | ○ |
| -3 | 31.5 | | 210000 | 71000 | 2.94 | ○ |
| Comp. 2-1 | 20.2 | — | 198000 | 101500 | 1.95 | ○ |
| -2 | 30.5 | | 198000 | 101000 | 1.96 | ○ |
| -3 | 33.0 | | 199000 | 101000 | 1.97 | ○ |
| Comp. 3-1 | 15.2 | 3.8 | — | — | — | X |
| -2 | 18.6 | 3.5 | 60000 | 27400 | 2.19 | ○ |
| -3 | 26.0 | 3.4 | 60000 | 27400 | 2.19 | ○ |
| Comp. 4-1 | 17.6 | 3.7 | 58000 | 29300 | 1.98 | ○ |
| -2 | 22.6 | 3.4 | 58000 | 29100 | 1.99 | ○ |
| -3 | 26.5 | 3.3 | 57800 | 29200 | 1.98 | ○ |
| Comp. 5-1 | 20.0 | — | 190000 | 104000 | 1.83 | Δ |
| -2 | 25.5 | | 191000 | 104000 | 1.83 | Δ |
| -3 | 31.5 | | 190000 | 103000 | 1.84 | Δ |

Note: With Comparative example 1-1 and Comparative example 3-1, the molecular weight could not be measured, since the resin solutions immediately after production were pudding-like.

TABLE 2

Results of primer test

| | Prime material | | | | | | |
|---|---|---|---|---|---|---|---|
| | PP | | | PVC | PC | PET | ABS | Nylon |
| | Adherence (/100) | Gasohol resistance | Water resistance | Adherence (/100) | Adherence (/100) | Adherence (/100) | Adherence (/100) | Adherence (/100) |
| Ex. 3-1 | 100 | Good | Good | 100 | 100 | 100 | 100 | 100 |
| -2 | 100 | Good | Good | 100 | 100 | 100 | 100 | 100 |
| -3 | 100 | Good | Good | 100 | 100 | 100 | 100 | 100 |
| Ex. 4-1 | 100 | Good | Good | 100 | 100 | 100 | 100 | 100 |
| -2 | 100 | Good | Good | 100 | 100 | 100 | 100 | 100 |
| -3 | 100 | Good | Good | 100 | 100 | 100 | 100 | 100 |
| Comp. 3-1 | — | — | — | — | — | — | — | — |
| -2 | 100 | Good | Good | 50 | 30 | 0 | 70 | 0 |
| -3 | 100 | No good | Good | 30 | 10 | 0 | 50 | 0 |

TABLE 2-continued

Results of primer test

| | Prime material | | | | | | |
|---|---|---|---|---|---|---|---|
| | PP | | | PVC | PC | PET | ABS | Nylon |
| | Adherence (/100) | Gasohol resistance | Water resistance | Adherence (/100) | Adherence (/100) | Adherence (/100) | Adherence (/100) | Adherence (/100) |
| Comp. | | | | | | | | |
| 3-1 | 100 | Good | Good | 70 | 50 | 0 | 50 | 20 |
| -2 | 100 | Good | Good | 60 | 0 | 0 | 50 | 20 |
| -3 | 100 | Good | Good | 20 | 0 | 0 | 20 | 0 |

Note: With Comparative example 3-1, each test could not be carried out, since the resin solution immediately after production was pudding-like.

TABLE 3

Results of adhesiveness test

Heat seal strength (g/cm)

| | PP prime material | PVC prime material | PET prime material |
|---|---|---|---|
| Ex. 1-1 | 860 | 830 | 830 |
| -2 | 780 | 770 | 750 |
| -3 | 690 | 710 | 650 |
| Ex. 2-1 | 900 | 820 | 780 |
| -2 | 880 | 700 | 750 |
| -3 | 730 | 680 | 660 |
| Ex. 3-1 | 1200 | 1050 | 1100 |
| -2 | 1000 | 1000 | 1050 |
| -3 | 850 | 920 | 900 |
| Ex. 4-1 | 1300 | 1350 | 1400 |
| -2 | 1100 | 1200 | 1380 |
| -3 | 900 | 1140 | 1220 |
| Comp. 1-1 | — | — | — |
| -2 | 500 | 30 | 0 |
| -3 | 400 | 0 | 0 |
| Comp. 2-1 | 600 | 200 | 50 |
| -2 | 500 | 100 | 30 |
| -3 | 350 | 0 | 0 |
| Comp. 3-1 | — | — | — |
| -2 | 700 | 50 | 0 |
| -3 | 600 | 0 | 0 |
| Comp. 4-1 | 1000 | 30 | 10 |
| -2 | 800 | 10 | 0 |
| -3 | 650 | 0 | 0 |
| Comp. 5-1 | 780 | 400 | 300 |
| -2 | 680 | 200 | 280 |
| -3 | 600 | 180 | 100 |

Note:
With Comparative example 1-1 and Comparative example 3-1, the tests could not be carried out, since the resin solutions immediately after production were pudding-like.

TABLE 4

Results of ink test

| | Peeling with adhesive tape | | | Heat seal strength (g/cm) | | |
|---|---|---|---|---|---|---|
| | PP prime material | PVC prime material | PET prime material | PP prime material | PVC prime material | PET prime material |
| Ex. 1-1 | Good | Good | Good | 650 | 680 | 630 |
| -2 | Good | Good | Good | 590 | 600 | 530 |
| -3 | Good | Good | Good | 450 | 460 | 420 |
| Ex. 2-1 | Good | Good | Good | 700 | 720 | 750 |
| -2 | Good | Good | Good | 500 | 700 | 700 |
| -3 | Good | Good | Good | 400 | 660 | 650 |
| Ex. 3-1 | Good | Good | Good | 900 | 1000 | 1050 |
| -2 | Good | Good | Good | 850 | 940 | 980 |
| -3 | Good | Good | Good | 700 | 880 | 950 |
| Ex. 4-1 | Good | Good | Good | 1000 | 1100 | 1200 |
| -2 | Good | Good | Good | 920 | 1050 | 1100 |
| -3 | Good | Good | Good | 780 | 1000 | 1150 |

TABLE 4-continued

Results of ink test

| | Peeling with adhesive tape | | | Heat seal strength (g/cm) | | |
|---|---|---|---|---|---|---|
| | PP prime material | PVC prime material | PET prime material | PP prime material | PVC prime material | PET prime material |
| Comp. 1-1 | — | — | — | — | — | — |
| -2 | Good | No good | No good | 400 | 0 | 0 |
| -3 | Good | No good | No good | 320 | 0 | 0 |
| Comp. 2-1 | Good | No good | No good | 580 | 100 | 30 |
| -2 | Good | No good | No good | 410 | 40 | 0 |
| -3 | Good | No good | No good | 290 | 0 | 0 |
| Comp. 3-1 | — | — | — | — | — | — |
| -2 | Good | No good | No good | 530 | 0 | 0 |
| -3 | Good | No good | No good | 440 | 0 | 0 |
| Comp. 4-1 | Good | No good | No good | 680 | 0 | 0 |
| -2 | Good | No good | No good | 510 | 0 | 0 |
| -3 | Good | No good | No good | 450 | 0 | 0 |
| Comp. 5-1 | Good | Good | Good | 540 | 200 | 200 |
| -2 | Good | Good | Good | 480 | 50 | 250 |
| -3 | No good | No good | No good | 230 | 0 | 0 |

Note: With Comparative example 1-1 and Comparative example 3-1, the tests could not be carried out, since the resin solutions immediately after production were pudding-like.

UTILIZABILITY IN THE INDUSTRY

From Table 1, the chlorinated products of propylenic random copolymer produced by using metallocene catalyst as a polymerization catalyst have good liquid state, even if the chlorine content may be low. Moreover, from Table 2, the chlorinated products of propylenic random copolymer produced by using metallocene catalyst as a polymerization catalyst have better gasohol resistance than that of the chlorinated products of IPP produced by using conventional Ziegler•Natta catalyst as a polymerization catalyst. Furthermore, from Tables 2 through 4, the chlorinated products of propylenic random copolymer produced by using metallocene catalyst as a polymerization catalyst exhibit good adherence not only onto polypropylene prime material, but also onto prime materials of poly(vinyl chloride), polycarbonate, PET, ABS, nylon, etc. It can be seen therefore that the binder resin compositions containing these chlorinated propylenic random copolymers and/or carboxyl group-containing chlorinated propylenic random copolymers are useful in the industry and, in particular, effective for paint, adhesive, heat sealing agent, printing ink and primer.

The invention claimed is:

1. A binder resin composition, comprising:
(i) a chlorinated isotactic propylenic random copolymer having a weight average molecular weight of 3000 to 250000 and a Mw/Mn of less than 2, wherein the chlorinated isotactic propylenic random copolymer is obtained by copolymerizing propylene with one or more other α-olefins in the presence of a metallocene catalyst and chlorinating to a chlorine content of 10 to 40% by weight based on the total weight of the binder resin composition,
(ii) a stabilizer, and
(iii) an organic solvent.

2. The binder resin composition of claim 1, wherein the chlorinated isotactic propylenic random copolymer is a carboxyl group-containing chlorinated isotactic propylenic random copolymer with weight average molecular weight of 30000 to 220000, graft polymerized with α,β-unsaturated carboxylic acid or its anhydride in amounts of 0 to 20% by weight and then chlorinated to chlorine content of 10 to 40% by weight, or chlorinated to a chlorine content of 10 to 40% by weight and then graft polymerized with α,β-unsaturated carboxylic acid or its anhydride in amounts of 0 to 20% by weight.

3. The binder resin composition of claim 1 or 2, wherein the isotactic propylenic random copolymer has a melting point (Tm) measured by differential scanning calorimeter (DSC) of 115 to 165° C.

4. A method of producing the binder resin composition of claim 1 or 2, using the chlorinated isotactic propylenic random copolymer, wherein isotactic propylenic random copolymer with melting point (Tm) measured by differential scanning calorimeter (DSC) of 115 to 165° C. obtained by copolymerizing propylene with other α-olefin in the coexistence of metallocene catalyst is chlorinated to chlorine content of 10 to 40% by weight.

5. A method of producing binder resin composition of claim 4, wherein the chlorinated isotactic propylenic random copolymer is a carboxyl group-containing chlorinated isotactic propylenic random copolymer graft polymerized with α,β-unsaturated carboxylic acid or its anhydride in amounts of 0 to 20% by weight and then chlorinated to chlorine content of 10 to 40% by weight, or chlorinated to chlorine content of 10 to 40% by weight and then graft polymerized with α,β-unsaturated carboxylic acid or its anhydride in amounts of 0 to 20% by weight.

6. A paint applicable to films, sheets and moldings of polyolefin, poly(vinyl chloride), polycarbonate, PET, ABS and nylon, having the binder resin composition of claim 1 or 2 as an effective component.

7. A printing ink applicable to films, sheets and moldings of polyolefin, poly(vinyl chloride), polycarbonate, PET, ABS and nylon, having the binder resin composition of claim 1 or 2 as an effective component.

8. An adhesive applicable to films, sheets and moldings of polyolefin, poly(vinyl chloride), polycarbonate, PET, ABS and nylon, having the binder resin composition of claim 1 or 2 as an effective component.

9. A heat sealing agent applicable to films, sheets and moldings of polyolefin, poly(vinyl chloride), polycarbonate, PET, ABS and nylon, having the binder resin composition of claim 1 or 2 as an effective component.

10. A primer applicable to films, sheets and moldings of polyolefin, poly(vinyl chloride), polycarbonate, PET, ABS and nylon, having the binder resin composition of claim 1 or 2 as an effective component.

* * * * *